United States Patent [19]

Meyers et al.

[11] 4,335,562
[45] Jun. 22, 1982

[54] ROCK TRAP FOR FARM VEHICLE

[76] Inventors: Alma D. Meyers, 2320 Gardner, Croswell, Mich. 48422; Robert L. Tesluck; Thomas R. Tesluck, both of 7575 Brockway Rd., Yale, Mich. 48097

[21] Appl. No.: 220,426

[22] Filed: Dec. 29, 1980

[51] Int. Cl.³ .............................................. A01F 12/10
[52] U.S. Cl. ................................. 56/10.2; 130/27 JT
[58] Field of Search ........................ 56/10.2, DIG. 15; 130/27 JT, 27 R, 27 S

[56] References Cited

U.S. PATENT DOCUMENTS 3,971,390 7/1976 McDuffie et al. .................... 56/10.2

FOREIGN PATENT DOCUMENTS 1352470 5/1974 United Kingdom .............. 130/27 T

Primary Examiner—Jay N. Eskovitz
Attorney, Agent, or Firm—Cullen, Sloman, Cantor, Grauer, Scott & Rutherford

[57] ABSTRACT

A rock trap for a farm vehicle such as a combine or the like removes rocks from crops being harvested thus preventing rocks from entering the threshing area of the combine. Crop material is fed through a feeder house toward a drum and all the crop material moves under the drum. Rocks are forced by the drum into a storage trap. The crop material is then fed to the threshing area. The storage trap opens when full to drop the rocks on the ground and the storage trap also opens when a large rock is forced against the trap by the drum. Thus the rocks which enter the feeder house do not reach the threshing area of the combine.

8 Claims, 10 Drawing Figures

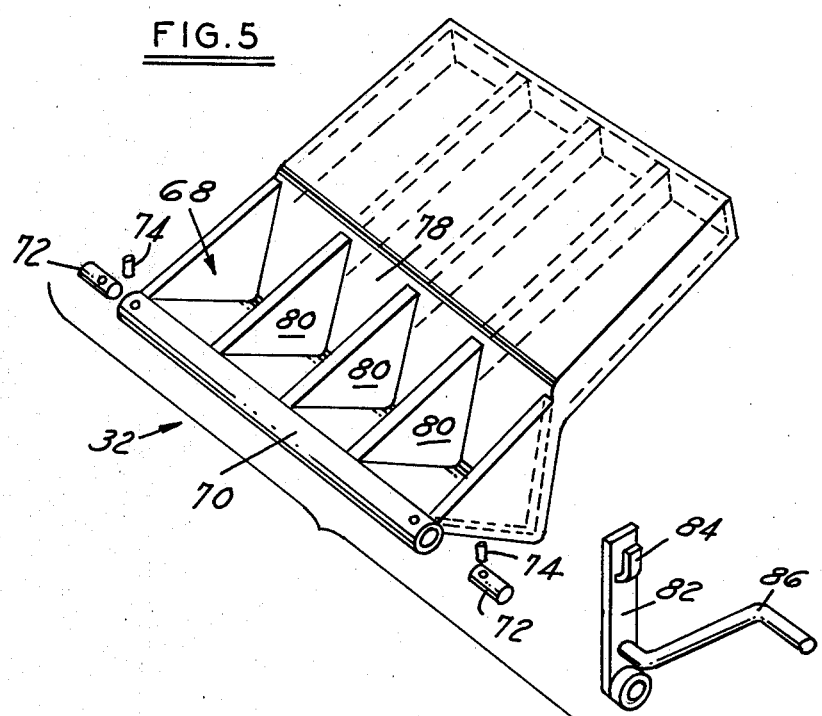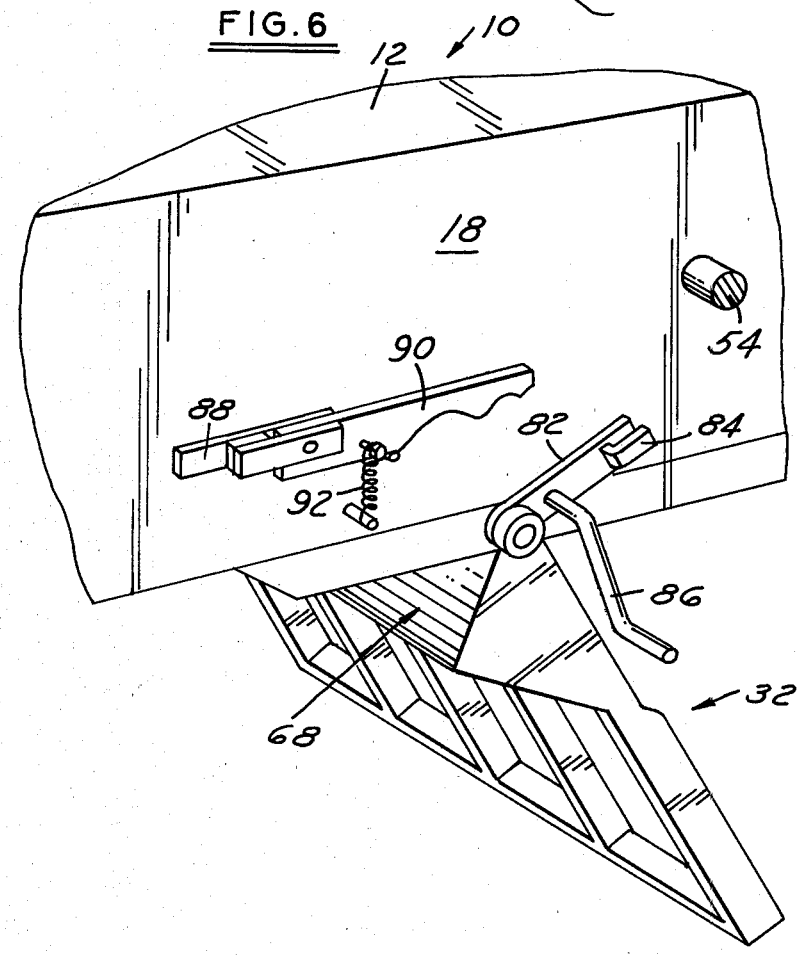

ROCK TRAP FOR FARM VEHICLE

BACKGROUND OF THE INVENTION

This invention relates generally to farm vehicles such as combines or the like and, more particularly, to an improved rock trap for a farm vehicle for preventing rocks from entering the threshing area of the combine.

It is known that in the use of farm vehicles such as combines for harvesting crops, the crop material is picked up from the ground or cut direct from the ground by a header and fed by a conveyor system through a feeder house or chute to the threshing portion of the machine. This is true both in conventional drum or cylinder type threshing machines and in rotary threshing machines.

Prior to the present invention, a rock ejector apparatus was provided for certain types of combines. The rock ejector extended across the feeder house, intermediate the headers and the threshing area, and rocks coming into contact with the rock ejector were ostensibly pushed downward through a closeable doorway in the bottom of the feeder house. Such rock ejectors have been singularly unsuccessful in preventing rocks from entering the threshing area.

The damage caused to threshing machines by rocks is extremely serious in several respects. First of all, a rock entering the threshing area can damage the threshing drum or rotors, depending upon whether a standard or rotary combine is being used, thus damaging the threshing machine and rendering the same inoperable until repaired. Rocks of sufficient size which enter the threshing area are oft times moved with such force that they break through the metal walls of the combine resulting in even further damage. The damage cannot be measured solely in terms of the expense of repairing the combine but must also be measured in terms of the loss of productivity of the machine in harvesting crops, especially since the harvesting season is of short duration. The failure to harvest crops at the appropriate time can render the crops worthless and the financial loss thus incurred is far greater than the cost of repairing the combine.

The problem of rocks entering the feeder house and ultimately reaching the threshing area are so severe and the ineffectiveness of a rock ejector is so well understood that the manufacturers of combines will not provide any warranty or guarantee against the type of rock damage when selling combines.

Accordingly, prior to the present invention, there was no effective technique for removing rocks from crop material being harvested and thus preventing not only the costly repairs to the combine but also the potential loss of crops due to the inability to use a machine while it is being repaired.

SUMMARY OF THE INVENTION

The present invention provides a new approach toward solving the problem of rocks entering the feeder house or chute of a farm vehicle such as a combine. The present invention makes it a virtual certainty that all rocks which are of a sufficient size to cause any damage to the combine are caught in a rock storage trap and ultimately dropped from the feeder house without reaching the threshing area.

The present invention provides a novel approach to the problem of preventing rocks from reaching the threshing area by insuring that all crop material containing rocks moves between a storage trap in the bottom of the feeder house and a drum. The storage trap forms part of a door which closes a doorway or opening in the bottom of the feeder house. The drum forces the rocks into the storage trap or holding area which opens automatically when full. The storage trap or holding area also opens automatically if rocks of sufficiently large size are forced by the drum into the storage trap. This should be contrasted to the prior rock ejector wherein the crop material and rocks often bypass the rock ejector completely such as by going over or around the rock ejector.

DESCRIPTION OF THE DRAWINGS

The various objects and advantages of the present invention, together with other objects and advantages which may be attained by its use, will become more apparent upon reading the following detailed description of the invention taken in conjunction with the drawings.

In the drawings, wherein like reference numerals identify corresponding parts:

FIG. 5 is an exploded view showing details of the rock trap and door of the present invention;

FIG. 6 is a partial perspective view of the rock trap and latch mechanism of the present invention;

DETAILED DESCRIPTION OF THE PRESENT INVENTION

Figure 1:
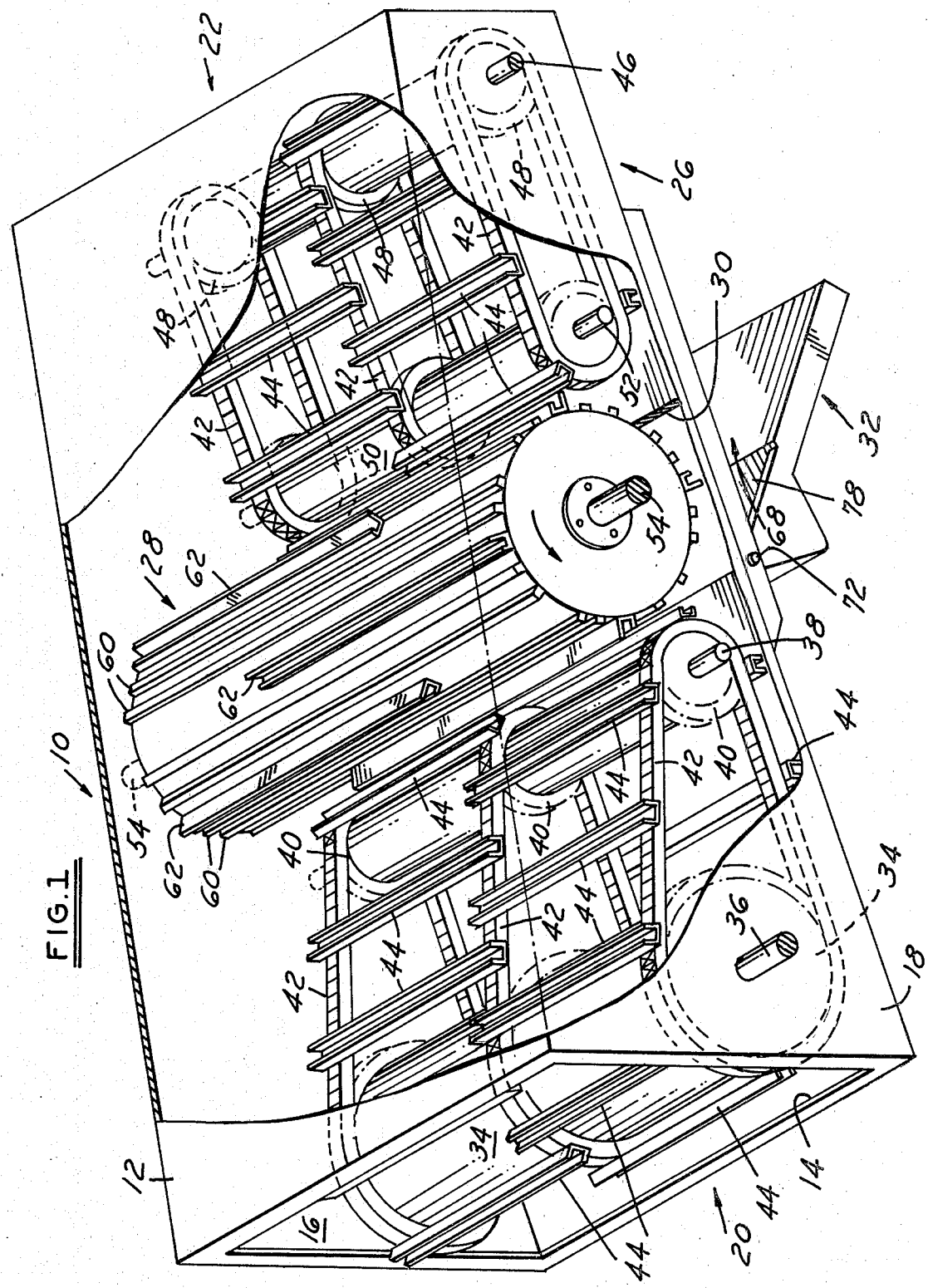
FIG. 1 is a partly broken away partial perspective illustration of the present invention.
Figure 2:
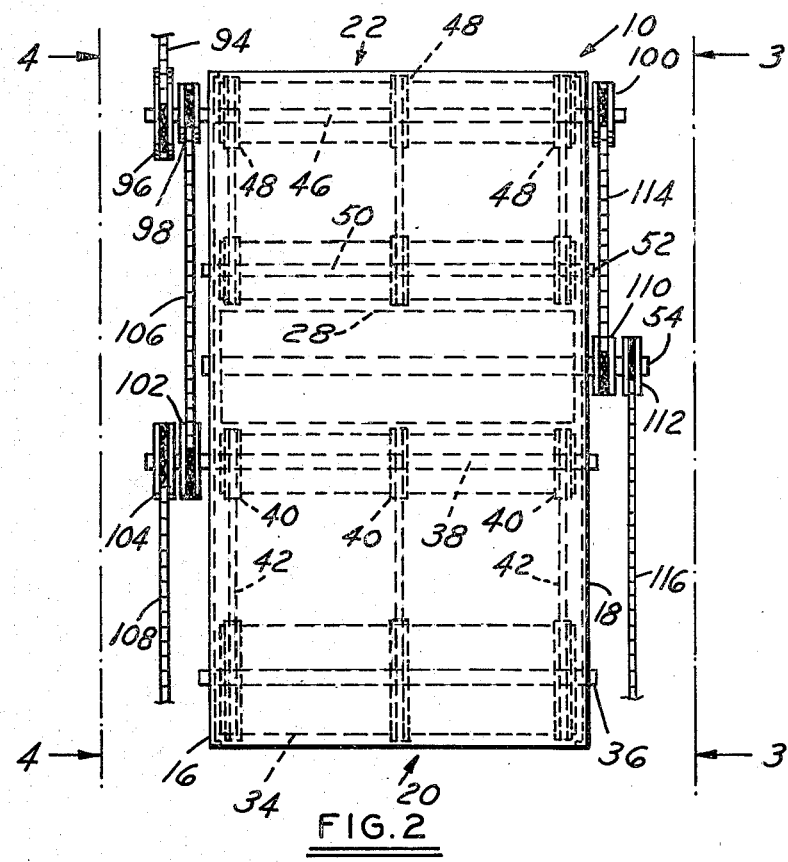
FIG. 2 is a plan view of the feeder house and drive system of the present invention.

With reference to the drawings there is illustrated a feeder house 10 through which the crop material moves from the headers (not shown) to the threshing area (not shown). The feeder house 10 is a rectangular, elongated, hollow metal structure having a top 12 a bottom 14 and opposed side walls 16, 18. The feeder house has a first open end 20 where the crop material enters from the headers and a second open end 22 through which the crop material exits and moves to the threshing area. The feeder house is approximately 40 inches wide, between the side walls 16, 18, approximately 24 inches high at the first end 20 and approximately 12 inches high at the second end 22. As is well known, the headers have augers or the like to pick up the crop material from the ground or to cut the crop material directly from the ground and convey the crop material into the feeder house. What has been described so far with respect to the feeder house is conventional and the dimensions are typical such as for a New Holland TR 75 Twin Rotor Combine.

Prior to the present invention a single drive chain was provided to convey the material through the feeder house. The drive chain was actually three parallel chains with a first series of bars or slats interconnecting the first and second chain and a second series of bars or slats interconnecting the second and third chain so that actually the bars or slats conveyed the crop material within the feeder house. The chain system typically extended the full length of the feeder house from the first end 20 to the second end 22, a distance of about 60 inches. In those instances where a rock ejector was used, the rock ejector was located between the two opposite ends 20, 22 of the feeder house and would act on the crop material through the chain means to attempt to eject rocks through a suitable doorway in the bottom 14 of the feeder house. The prior art rock ejector was an elongated drum positioned interiorly of the drive chain means and positioned over an aperture in the bottom of the feeder house which aperture was closed by a pivotally moveable door. As rocks passed beneath the rock ejector, the rocks were pushed by the rock ejector against the door and would tend to pivot the door open thus allowing the rocks to fall to the ground. However, the chain means tended to protect the rocks from the rock ejector and many rocks were not ejected through the doorway but rather were carried by the chain means up to the threshing area thus damaging the machine.

The present invention utilizes an entirely different approach to solving the problem of removing rocks from crop material which approach will now be explained.

Positioned within the feeder house 10 are first and second conveyor means 24, 26 respectively. Intermediate the first and second conveyor means is a rock drum 28 which extends across the interior of the feeder house and blocks the interior of the feeder house. The first conveyor means operates in a counter-clockwise direction to convey the crop material including rocks from the first end 20 under the conveyor means toward the rock drum. The rock drum also rotates in a counter-clockwise direction (as viewed in FIG. 1) and all the crop material passes beneath the rock drum 28. A rectangular opening 30 is provided in the bottom wall or floor 14 of the feeder house which opening is closed by a pivotally mounted trap means 32 and all rocks entering the feeder house and passing beneath the rock drum 28 are pushed through the opening 30 and into the trap means 32 as will be more fully described. The crop material which passes under the rock drum 28 is conveyed by the rotation of the rock drum to the second conveyor means 26. The second conveyor means 26 also rotates in a counter-clockwise direction, as viewed in FIG. 1, and all the crop material passes beneath the second conveyor means and is conveyed to the second end 22 of the feeder house where it exits from the feeder house and enters the threshing area of the combine. As used in this patent application the expression that "no rocks reach the second conveyor means" indicates that no rocks of a size sufficient to cause damage to the threshing members of the combine reach the second conveyor means.

The first conveyor means 24 of the present invention will now be explained. Just interiorly of the first end 20 of the feeder house is a large drum 34 of approximately 12 inch diameter and mounted approximately 10 inches above the bottom 14 of the feeder house. This drum 34 extends transversely across the feeder house. At opposite ends of the drum 34 are shafts 36 suitably journaled within the side walls 16, 18 of the feeder house so that the drum 34 is rotatably mounted within the feeder house.

Approximately 23 inches inwardly of the feeder house from the axis of the drum 34 and shafts 36 is an elongated drive shaft 38 having an outside diameter of about 1.75 inches. The drive shaft 38 is journaled through suitable openings in the side walls 16, 18 of the feeder house for rotation therein and three sprockets 40 are mounted on the shaft 38 interiorly of the feeder house. One of the sprockets is mounted in the center of the feeder house, i.e., half-way between the side walls 16, 18, and the other two sprockets are mounted at the extreme interior edges of the feeder house just adjacent the interior of the side walls 16, 18.

The first conveyor means 24 further includes three endless chains 42 each of which extends over one sprocket and over the drum 34. The first and second endless chains are held together by a first series of spaced apart bars 44 which are attached thereto and the second and third chains are held together by a second series of spaced apart bars 44 which are offset from the first series of bars. The sprockets 40 are of a 6 inch diameter and the axis of the drive shaft 38 is approximately 6 and ½ to 7 inches above the floor or bottom 14 of the feeder house.

The second conveyor means 26 of the present invention will now be described. At the upper or second end 22 of the feeder house is an elongated drive shaft 46 suitably journaled through the side walls 16, 18 of the feeder house and having three sprockets 48 mounted thereon. The sprockets are of a 6 inch diameter and one sprocket is positioned intermediate the side walls 16, 18 of the feeder house while the second and third sprockets are adjacent the interior of the side walls 16, 18 of the feeder house. This drive shaft 46 is also mounted approximately 6 and ½ to 7 inches above the floor of the feeder house. Approximately 23 inches downwardly toward the first end 20 from the axis of the drive shaft 46 is a drum 50 rotatably mounted on a shaft 52 with the shaft 52 journaled for rotation in the side walls 16, 18 of the feeder house. The drum is of a 6 inch diameter and is mounted about 6 and ¼ to 6 and ½ inches above the floor of the feeder house. The second conveyor means also includes three endless chains 42 each of which extends over one sprocket 48 and over the drum 50. The first pair of chains in the second conveyor means are interconnected by a series of spaced apart bars 44 and the second and third chains are also held together by a second series of spaced apart bars 44 which are offset from the first series of bars. The distance between the axis of shaft 52 and the axis of shaft 38 is approximately 15 inches. The sprockets are each keyed to their respective shafts.

It should be further explained that the upper drive shaft and sprocket system 46, 48 is identical to the lower drive shaft and sprocket system 38, 40. The upper drive shaft and sprocket system 46, 48 is identical to the system as originally supplied on the New Holland combine heretofore discussed as is the lower drum 34 and its drive shaft 36. Thus the first difference interiorly of the feeder house is the use of first and second conveyor means as distinguished from a single conveyor means extending the full longitudinal distance of the housing.

Figure 3:
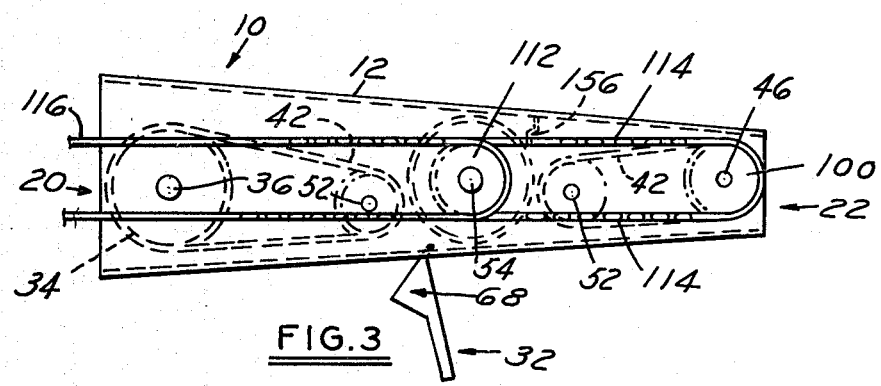
FIG. 3 is a side view as seen in the direction of arrows 3—3 of FIG. 2.

As the crop material including rocks is fed from the headers into the first end 20 of the feeder house 10, the first conveyor means 24 moves in a counter-clockwise direction as seen in FIGS. 1 and 3 so that the crop material moves between the conveyor means and the bottom 14 of the housing. The conveyor means moves the crop material underneath the rock drum 28 so that all the crop material passes between the rock drum 28 and the opening 30 in the bottom 14 of the housing. All of the crop material which moves beyond the rock drum 28 is picked up by the second conveyor means 26 and moved between the conveyor means and the bottom 14 of the housing and moves upwardly toward the second end 22. It must be understood that the rock drum in essence blocks the entire interior of the housing 10 side-to-side and top-to-bottom, so that all crop material must pass beneath the rock drum. This is to be contrasted with the prior rock ejectors where crop material could pass over or along side of the rock ejector.

The rock drum and rock trap means will now be explained in greater detail. The rock drum 28 is a large cylindrical drum of approximately 12 inch diameter and substantially closed at each end. At each end of the rock drum 28 an opening is provided. A stub shaft 54 and disc 56 is bolted over the opening in the drum end so that the stub shaft extends both inwardly and outwardly of the drum. The stub shafts are rotatably mounted in bearings 58 as will be explained hereinafter. The stub shaft, which has about a 1 and ½ inch outside diameter goes through an opening in the side wall of the feeder house. The use of removable bearings 58 on the exterior of the side walls, as explained later, permits convenient removal of the rock drum from the feeder house.

The 12 inch diameter drum is mounted approximately 7 and ½ inches above the floor of the feeder house just over the opening 30. This height of the rock drum relative to the floor of the housing is adjustable depending on the particular type of crop material to be processed.

Sixteen equally spaced apart ½ inch square bars 60 are welded to the exterior of the drum around the circumference thereof. Also welded to the periphery of the rock drum are a plurality of spaced apart channels 62. Each of the channels has a length slightly more than half the length of the rock drum and the channels are bolted to the drum in first and second series. Each series is offset laterally from the other series and, in addition, each series of channels includes four channels. Thus there are four bars 60 between each pair of channels 62. In a preferred embodiment each channel 62 is U-shaped in cross section having a short, flat leg 64 and a longer leg 66 which end in a toothed configuration. The channels 62 are bolted to the periphery of the drum such that based upon a counter-clockwise rotation of the drum as seen in FIGS. 1, 3, 9 and 10 the longer toothed leg of the channel will be the trailing edge of the channel to provide longer life when these channels come in contact with rocks or the like.

The trap means 32 which closes the opening 30 in the floor or bottom 14 of the feeder house 10 will now be explained. The trap means 32 is a generally rectangular plate having a well or receptacle portion 68 at one end thereof. The trap means 32, which is made of metal, includes as an integral part thereof an elongated hollow pipe 70 at one end thereof adjacent the well or receptacle which facilitates mounting of the trap means 32 to the feeder house. Specifically, as illustrated in the exploded view in FIG. 5, a pair of opposed pins 72 are provided for the opposite ends of the pipe 70 and when the pins are inserted in their respective ends of the pipe, drive pins 74 are inserted through aligned apertures in the pipe 70 and the pivot pins 72 to secure the pivot pins to the pipe. At one side of the trap means 32 a handle member 76 is welded to its associated pivot pin 72. A series of slits are cut on one side 78 of the well and three spaced apart ribs 80 extend through the slits as reinforcing members. These ribs are welded to the well and to the underside of the flat portion of the trap means 32.

The handle member 76 which is welded to the pivot pin at one side of the feeder house includes an elongated flat member 82 terminating at a first end thereof in an aperture to receive the pivot pin 72. The opposite end of the flat member includes an L-shaped leg 84 welded to the flat member 82, and a handle 86 is welded to the flat member intermediate the two ends. The trap means 32 is pivotally connected to the feeder house by inserting the pivot pins 72 through suitable aperatures in the side walls 16, 18 of the feeder house just in front of the open end 30 so that the well or receptacle 68 extends just slightly forward, i.e., toward the first end 20, of the rock drum 28. The reason for this configuration is that large rocks will contact the slopping walls of the well under pressure from the rock drum 28 at an approximate 90° angle to create the greatest leverage for forcing the rock trap means open. The dimensions of the trap means 32 are approximately 34 and ½ inches from side-to-side and 15 and ½ inches from the pivot axis to the opposite end of the trap means. The well 68 itself is approximately 6 inches wide and 3 and ½ inches deep.

Means are provided for maintaining the trap means 32 in a normally closed position. Specifically, as illustrated in FIG. 6, a U-shaped bracket 88 is welded or otherwise secured to the side wall 18 of the housing. An elongated latch member 90 is pivotally mounted at one end between the legs of the bracket 88. A spring 92 urges the latch into a downward position; the spring being attached between the latch and a portion of the wall therebeneath. When the trap means 32 is pivoted to close the opening 30, the latch 90 drops between the portions 82, 84 of the handle member. The actual operation is that upon closing the trap means, the latch 90 is cammed upwardly until the trap means is closed at which time the latch 90 drops downwardly, under the influence of the spring 92, into the space between portions 82, 84. In this fashion the latch securely locks the trap means shut.

Figure 4:
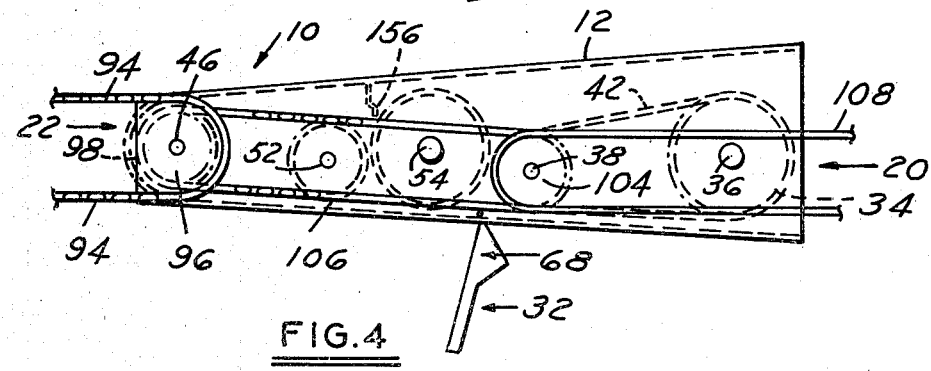
FIG. 4 is a side view as seen in the plane of arrows 4—4 of FIG. 2.

FIGS. 3, 4 and 6 illustrate the trap means in the open position. Initially, of course, the trap 32 is closed. As crop material containing rocks passes beneath the rock drum 28, rocks are pushed into the well 68. Once the well is full, the next succeeding rock which is pushed into the well by the rock drum 28 forces the trap to open and thus the load of rocks will be dumped onto the ground. When this happens the operator of the farm vehicle must stop the vehicle and manually, through use of the handles 86, close and latch the trap.

It should also be pointed out that the trap will open automatically if a rock of a sufficiently large size moves underneath the rock drum 28 because the physical size of such a rock would be greater than the capacity of the well. Furthermore, if a rock is held between the rock drum 28 and one of the ribs 80 of the trap means, the pressure from the rotating rock drum will also force the trap means open so that the rock will drop onto the ground.

Having thus described the details of the present invention, the drive system will now be explained. The combine is conventionally provided with a main drive chain 94 to drive the conveyor means and the header. According to the principles of the present invention, this main drive chain 94 is looped around and engages a sprocket 96 which is keyed on the shaft 46 exteriorly of the housing 10. A second sprocket 98 is keyed on shaft 46 adjacent sprocket 96, and a third sprocket 100 is keyed on shaft 46 on the opposite side of the feeder house.

On one side of the feeder house 10, preferably the same side 16 as the sprockets, a pair of sprockets 102, 104 are keyed onto shaft 38. A first chain 106 is looped around sprockets 98 and 102 and a second chain 108 is looped from sprocket 104 to the header (not shown) at the first end 20 of the feeder house.

On the second side 18 of the feeder house a double sprocket 110, 112 is mounted to shaft 54. A chain 114 is looped around sprocket 100 and sprocket 110, and a second chain 116 is looped around sprocket 112 and extends to the header (not shown) on the side 18 of the feeder house. To further explain the sprockets and chains, with respect to the side 16 of the feeder house, it will be seen that by virtue of chain 106, the first conveyor means and second conveyor means are driven in synchronization. A slip clutch is provided between sprockets 102 and 104 so that if the first conveyor means or the header binds in any way the slip clutch prevents any damage. On the second side 18 of the feeder house, the diameter of the sprocket 110 is smaller than the diameter of the sprocket 100 so that the rock drum is preferably rotated at a faster speed than the conveyor means. This provides the additional benefit of insuring that all rocks are pushed into the trap means 32.

Figure 7:
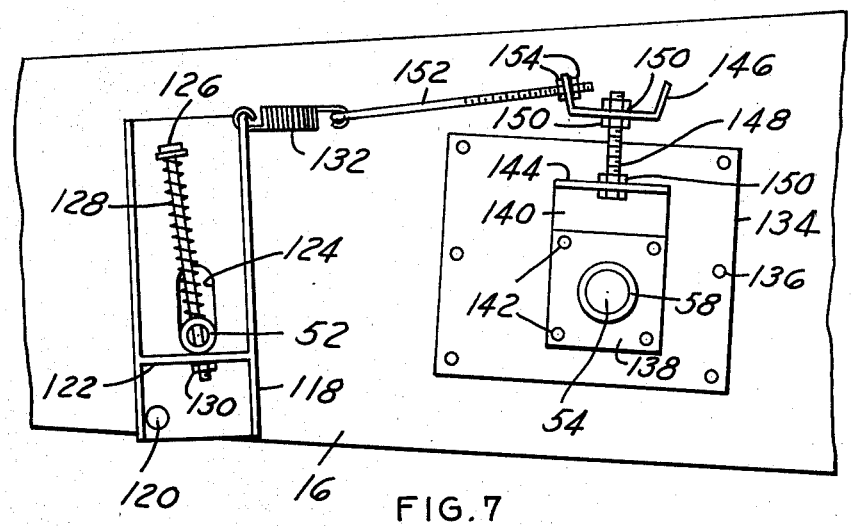
FIG. 7 is a side view illustrating the adjustable rock drum mounting and the drive chain tensioning means of the present invention.
Figure 8:
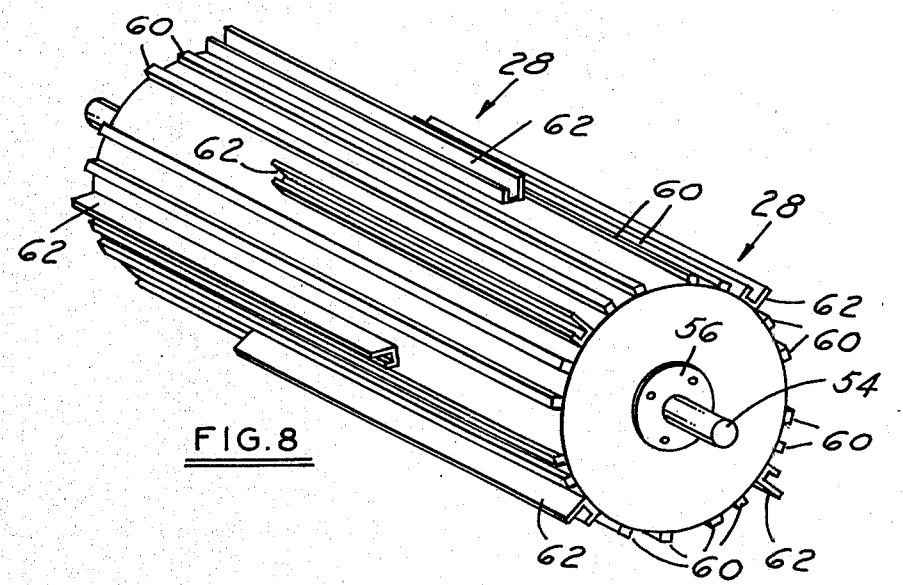
FIG. 8 is a perspective view of the drum of the present invention.
Figure 9:
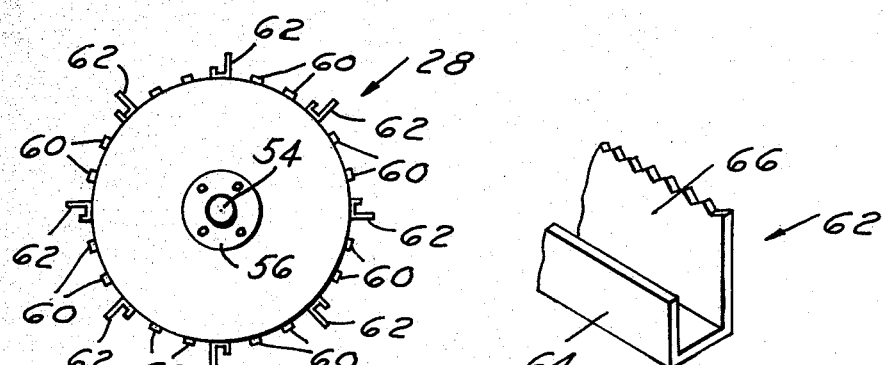
FIG. 9 is an end view of the rock drum of FIG. 8, including the channels and spacer bars thereon.
Figure 10:
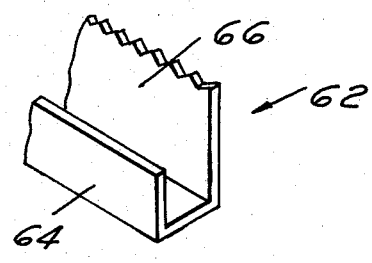
FIG. 10 is a partial perspective view of the channel on the rock drum of FIGS. 8 and 9.

The shaft 36 for the drum 34 is conventionally mounted with suitable tension devices to pick up any slack in the chain and to permit the drum 34 mounted thereon to move vertically upwardly as necessary if any large clumps of crop material and/or any rocks move beneath the drum. A different type of mounting is provided for the shaft 52 on which drum 50 is mounted in the second conveyor means and this mounting will now be explained with respect to FIG. 7. The shaft 52 is mounted the same way at both sides of the feeder house and only the mounting on side 16 will be explained. A rectangular aperture is provided in the side wall 16 of the feeder house and a large U-shaped in plan view plate 118 has its base mounted on a pivot 120 to the frame of the feeder house. This U-shaped plate has a horizontal cross bar 122 welded to the legs of the plate and a vertically elongated slot 124 in the base above the cross bar. The bottom of the slot is positioned so that when the shaft 52 is inserted in the slot the shaft will rest on the cross bar. A long threaded bolt 126 mounted in a spring 128 extends through an aperture on the shaft 52 and through an aperture in the cross bar 122 and a nut 130 is threaded onto the bolt on the lower side of the cross bar. Thus if large clumps of crop material tend to raise the drum 50 and shaft 52, the spring 128 resiliently pushes the shaft downwardly.

At the upper leg of the plate 118 a spring 132 urges the plate 118 to rotate about the pivot 120 in a direction to maintain tension on the drive chain 114. In this fashion the two springs 128 and 130 cooperate to maintain proper drive chain tension. The preferred fastening of the spring 132 will be explained in the context of the rock drum adjustment system.

The rock drum 28 is adjustably mounted relative to the floor of the feeder house since the clearance between the drum 28 and the feeder house floor is desirably variable depending on the crop being harvested. The mounting is the same on each side and will be explained with reference to side 16 of the feeder house.

A large rectangular mounting plate 134 is bolted by bolts 136 to the wall 16. A housing 138 containing the bearings 58, and having an L-shaped draw plate 140 secured thereto, is bolted by bolts 142 to the mounting plate. The mounting plate 134 has elongated slots therein to receive the bolts 142 so that the housing 138 and draw plate 140 may be moved vertically relative to the plate 134. One leg of the draw plate 140 is parallel to mounting plate 134 and positioned between plate 134 and housing 138 and the other leg 144 is above housing 138 and extends outwardly from the wall 16.

A U-shaped draw bar 146 is welded to the wall 16 above the mounting plate 134 and a threaded bolt 148 extends through aligned holes in both the leg 144 of plate 140 and the draw bar 146. Suitable nuts 150 are placed on the bolt 148 on opposite sides of the draw bar 146 and on the side of leg 144 opposite the head of the bolt 148. Upon loosening bolts 142 and nuts 150 the bearing housing 138 and draw plate 140 may be moved vertically, with the loose bolts 142 sliding in the slots in the mounting plate 134, to adjustably position the rock drum vertically. Then nuts 150 and bolts 142 are tightened.

It is necessary to secure spring 132 to a fixed member to provide the desired pivoting movement relative to pivot 120 for tensioning the drive chain. For convenience we secure spring 132 to the draw bar 146 using a long threaded bolt 152 having two nuts 154 thereon. The bolt 152 goes through an aperture in the draw bar with the nuts 154 threaded on the bolt on opposite sides of the draw bar. This provides the added advantage that as the drive chain 114 stretches during use the nuts 154 can be adjusted to take up any slack in the chain thus maintaining proper chain tension.

Upon testing the present invention it was found that virtually all rocks of a size sufficient to damage a threshing machine were trapped in the well 68 or were directly ejected by forcing open the trap means 32. No rocks of a size sufficient to damage the thresher were able to move upward through the feeder house beyond the rock drum and trap. Accordingly, the present invention has successfully fulfilled a very serious need.

It is of extreme importance that the rock drum sufficiently block the interior of the feeder house, from side-to-side and top-to-bottom, so that all crop material and rocks pass beneath the rock drum. In the case of the present invention where a modification was made to an existing New Holland combine as heretofore described, it was necessary to provide filler members interiorly of the housing between the interior of the side walls and sides of the rock drum to prevent crop material from passing therebetween. In addition, because of the size of the housing it was necessary to provide means to block the vertically upper part of the interior of the feeder house so that any crop material which tended to fly up above the rock drum would not move onto the second conveyor means. To accomplish this, a ledge means 156 was provided across the interior of the feeder house from wall 16 to wall 18. The ledge means was welded to the underside of the top 12 of the feeder house and extends across the feeder house just rearwardly of the rock drum 28. This ledge means blocks any crop material and rocks from moving over the top of the rock drum and onto the second conveyor means 26.

The foregoing is a complete description of a preferred embodiment of the present invention. Various changes may be made without departing from the spirit of the present invention. For example, it may be that the augers in the header of a conventional threshing machine would provide sufficient conveying of crop material that the front conveyor means 24 may be dispensed with. Alternatively a series of rock drums 28 could be spaced apart along the housing, from the first end to the second end, each rock drum having an opening and trap means associated therewith. Thus the rock drums would also provide the conveying function. Thus the invention should be limited only by the scope of the following claims.

What is claimed is:

1. In a farm vehicle such as a combine or the like for moving crop material through an elongated hollow feeder house from a first end thereof to a second end; said feeder house including a top, bottom and side walls and an aperture in the bottom through which rocks are to be ejected and a trap means for closing the opening in the bottom of the feeder house, the improvement comprising:

a rock drum rotatably mounted in said feeder house and substantially blocking the hollow interior thereof, said rock drum mounted intermediate the first and second ends of the feeder house and cooperating with said opening;

said rock drum including a plurality of U-shaped channels secured to the periphery of said drum for driving rocks toward said trap means, and bars secured to the periphery of said drum intermediate said channels for protecting said channels against damage from rocks;

first conveyor means for conveying the crop material from the rock drum toward the second end of the feeder house; said feeder house being free of said conveyor means between the rock drum and said opening; and means for rotating said drum so that all crop material moves between the rock drum and the opening;

said rock drum slightly compressing the crop material for preventing rocks from entering said conveyor means;

said rock drum for forcibly pushing rocks through said opening and against said trap means for opening said trap means to eject rocks both when said trap means is full and when sufficiently large rocks are positioned between said rock drum and said trap means.

2. The invention as defined in claim 1 wherein said rock drum is vertically positionable relative to the bottom of said feeder house.

3. The invention as defined in claim 2 and further including second crop conveyor means for conveying the crop material from said feeder house first end toward said rock drum and wherein said first and second crop conveyor means are driven at the same speed.

4. The invention as defined in claim 1 wherein said rock drum is driven at a speed faster than said crop conveyor means.

5. The invention as defined in claim 1 wherein said trap means includes a receptable capable of retaining a fixed volume of rock material.

6. The invention as defined in claim 1 wherein said trap means includes a door pivotally mounted to said feeder house;

said door being releasably retained in a closed position and being opened by the contact of large rocks being pushed thereagainst by said rock drum.

7. The invention as defined in claim 1 wherein said trap means includes a door pivotally mounted to said feeder house;

said door having a receptacle therein for storing a volume of rock material;

said door being releasably retained in a closed position and being opened when the volume of rock material in said receptacle tends to exceed the volume thereof.

8. The invention as defined in claim 1 wherein said channels are removable.

* * * * *